United States Patent
Megahed et al.

(10) Patent No.: US 10,742,534 B2
(45) Date of Patent: Aug. 11, 2020

(54) MONITORING SYSTEM FOR METRIC DATA

(71) Applicant: INTERNATIONAL BUSINESS MACHINES CORPORATION, Armonk, NY (US)

(72) Inventors: Aly Megahed, San Jose, CA (US); Mohamed Mohamed, San Jose, CA (US); Samir Tata, Cupertino, CA (US); Alaa Elwany, College Station, TX (US)

(73) Assignee: International Business Machines Corporation, Armonk, NY (US)

( * ) Notice: Subject to any disclaimer, the term of this patent is extended or adjusted under 35 U.S.C. 154(b) by 55 days.

(21) Appl. No.: 15/990,312

(22) Filed: May 25, 2018

(65) Prior Publication Data

US 2019/0363968 A1 Nov. 28, 2019

(51) Int. Cl.
*G06F 15/173* (2006.01)
*H04L 12/26* (2006.01)
*H04L 12/24* (2006.01)

(52) U.S. Cl.
CPC ............ *H04L 43/103* (2013.01); *H04L 41/06* (2013.01); *H04L 41/147* (2013.01); *H04L 43/08* (2013.01)

(58) Field of Classification Search
CPC ....... H04L 43/103; H04L 43/08; H04L 41/06; H04L 41/147
USPC ........................................................ 709/224
See application file for complete search history.

(56) References Cited

U.S. PATENT DOCUMENTS

| | | | |
|---|---|---|---|
| 8,108,235 B2 | 1/2012 | Chowdhary | |
| 8,600,915 B2 | 12/2013 | Thompson | |
| 8,635,328 B2 | 1/2014 | Corley | |
| 9,135,135 B2 | 9/2015 | Rao | |
| 9,235,556 B2 | 1/2016 | Yaakov | |
| 9,317,387 B2 | 4/2016 | Kariv | |
| 9,378,111 B2 | 6/2016 | Ramesh Coimbatore | |
| 9,405,593 B2 | 8/2016 | McGrath | |
| 9,483,392 B1 | 11/2016 | Chirgwin | |
| 9,501,330 B2 | 11/2016 | McGrath | |

(Continued)

FOREIGN PATENT DOCUMENTS

EP 2874064 A1 5/2015

OTHER PUBLICATIONS

Akbar et al., "Predicting Complex Events for Pro Active IoT Applications," 2015 IEEE 2nd World Forum on Internet of Things (WF-IoT), pp. 327-332, IEEE, 2015.

(Continued)

*Primary Examiner* — Wing F Chan
*Assistant Examiner* — Joseph R Maniwang
(74) *Attorney, Agent, or Firm* — Steven M. Bouknight

(57) ABSTRACT

A monitoring system for metric data may include devices, each device capable of generating respective metric data. The monitoring system may also include a processor and a memory cooperating therewith. The processor may be configured to monitor the devices via a network to obtain the respective metric data, generate predicted trigger events based on monitoring the devices, and generate a respective adapted monitoring for the devices based upon each predicted trigger event. The processor may also be configured to, upon occurrence of one of the predicted trigger events, implement the respective adapted monitoring to obtain new respective metric data.

17 Claims, 5 Drawing Sheets

(56) References Cited

U.S. PATENT DOCUMENTS

| | | |
|---|---|---|
| 9,628,340 B2 | 4/2017 | Blair |
| 10,235,263 B2 | 3/2019 | Megahed |
| 10,555,142 B2 | 2/2020 | Tata |
| 2009/0262656 A1 | 10/2009 | Branson |
| 2010/0077449 A1 | 3/2010 | Kwok |
| 2011/0088022 A1 | 4/2011 | Kruglick |
| 2012/0054331 A1 | 3/2012 | Dagan |
| 2012/0239739 A1 | 9/2012 | Manglik |
| 2013/0173803 A1 | 7/2013 | Pijewski |
| 2013/0290539 A1 | 10/2013 | Kodialam |
| 2014/0133453 A1 | 5/2014 | Maciel |
| 2015/0124612 A1 | 5/2015 | Schlansker |
| 2015/0286507 A1 | 10/2015 | Elmroth |
| 2016/0196527 A1 | 7/2016 | Bose et al. |
| 2017/0046374 A1 | 2/2017 | Fletcher |
| 2017/0168914 A1 | 6/2017 | Altman |
| 2018/0006888 A1* | 1/2018 | Vaughn ............... H04L 41/0826 |
| 2018/0189163 A1 | 7/2018 | Megahed |
| 2019/0082286 A1 | 3/2019 | Tata |
| 2019/0095478 A1 | 3/2019 | Tankersley |
| 2019/0196929 A1 | 6/2019 | Megahed |
| 2020/0029187 A1 | 1/2020 | Tata |

OTHER PUBLICATIONS

Bousdekis et al., "A Probabilistic Model for Context-Aware Proactive Decision Making," 2016 7th International Conference on Information, Intelligence, Systems & Applications (IISA), pp. 1-6, IEEE, 2016.

Zhu et al., "Predictive Analytics by using Bayesian Model Averaging for Large-Scale Internet of Things," International Journal of Distributed Sensor Networks 9, No. 12 (2013): 723260.

Engel et al., "A Basic Model for Proactive Event-Driven Computing," Proceedings of the 6th ACM International Conference on Distributed Event-Based Systems, pp. 107-118, ACM, 2012.

Tata et al., "An Optimization Approach for Adaptive Monitoring in IoT Environments," 2017 IEEE 14th International Conference on Services Computing, pp. 378-385, IEEE, 2017.

Megahed et al.; U.S. Appl. No. 15/397,882, filed Jan. 4, 2017.

U.S. Appl. No. 15/990,312, filed May 25, 2018, U.S. Pat. No. 2019-0363968.

U.S. Appl. No. 15/397,882, filed Jan. 4, 2017, U.S. Pat. No. 10,236,263, U.S. Pat. Pub. No. 2018-0189163.

U.S. Appl. No. 16/290,063, filed Mar. 1, 2019, U.S. Pat. No. 2019-0196929.

U.S. Appl. No. 15/700,0433, filed Sep. 8, 2017, U.S. Pat. No. 10,555,142, U.S. Pat. Pub. No. 2019-0082286.

U.S. Appl. No. 16/572,765, filed Sep. 17, 2019, U.S. Pat. No. 2020-0029187.

Doraisamy et al., "Metric Based Software Project Performance Monitoring Model", 2015 IEEE Conference on Open Systems (ICOS), Aug. 24-26, 2015, Melaka, Malaysia, pp. 12-17.

Seng et al., "DAML: Domain Adaptation Metric Learning", IEEE Transactions on Image Processing, vol. 20, No. 10, Oct. 2011, pp. 2980-2989.

IBM, "Method to manage reservation and allocation of scarce resources shared by tenants in a massively multi-tenant environment", IP.com Prior Art Database Technical Disclosure, Oct. 12, 2009. IP.com Number: IPCOM000188508D. 7 pages.

Jeswani, et al., "Adaptive Monitoring: A Framework to Adapt Passive Monitoring using Probing", 2012 8th International Conference on Network and Service Management (CNSM 2012): Mini-Conference. 7 pages.

Mell et al., "The NIST Definition of Cloud Computing", National Institute of Standards and Technology, Special Publication 800-145. Sep. 2011. 7 pages.

Munawar, et al., "Adaptive Monitoring with Dynamic Differential Tracing-based Diagnosis", DSOM 2008, LNCS 5273. 14 pages.

Rimal, "Workflow Scheduling in Multi-Tenant Cloud Computing Environments", IEEE Transactions on Parallel and Distributed Systems, vol. 28, No. 1, Jan. 2017. 15 pages.

Tata, et al., "Adaptive Multi-Tenant Monitoring in Resource Constrained Environments", U.S. Appl. No. 15/700,043, Filed Sep. 8, 2017.

Tata, et al., "Adaptive Multi-Tenant Monitoring in Resource Constrained Environments", U.S. Appl. No. 16/572,765, Filed Sep. 17, 2019.

Trinihas, et al., "AdaM: an Adaptive Monitoring Framework for Sampling and Filtering on IoT Devices", 2015 IEEE International Conference on Big Data. 10 pages.

IBM: List of IBM Patents or Patent Applications Treated As Related (Appendix P), Feb. 6, 2020, 2 pages.

\* cited by examiner

MONITORING SYSTEM FOR METRIC DATA

BACKGROUND

The present invention relates to computer systems, and more specifically, to monitoring systems. The Internet of Things (IoT) refers to the network of objects, devices, machines, vehicles, buildings, and other physical systems with embedded sensing, computing, and communication capabilities, that sense and share real-time information about the physical world. IoT integration in the industry and its market share are increasing. Among these connected things, massive amounts of monitoring data for different metrics are produced by sensors and devices.

Examples of sensors and devices are global positioning system (GPS) sensors, security cameras, and temperature sensors. These sensors and devices are used to monitor metrics such as weather metrics (temperature, humidity, etc.), health metrics (blood pressure, heartbeat, etc.), and transportation metrics (traffic accidents, traffic jams, etc.). Moreover, monitoring of metrics can be done at different monitoring frequencies that can be periodic or event-based. With periodic-based frequency, the monitoring happens at regular time periods (e.g., measure the blood pressure once per week, collect the temperature value once per hour, and monitor the memory consumption one time per second).

This type of monitoring may be referred to as monitoring by interval. Whereas with event-based frequency, monitoring of metrics is done when a certain pre-defined event occurs (e.g., monitoring the number of cars stuck in an accident whenever an accident occurs, measuring the average speed of vehicles when it rains, and monitoring the heart beat when the blood pressure exceeds a certain value). This type of monitoring may be referred to as monitoring on change. This means that the monitoring is done based on some properties and whenever one or more of these properties change, the data collection is triggered.

SUMMARY

A monitoring system for metric data may include a plurality of devices. Each device may be capable of generating respective metric data. The monitoring system may also include a processor and a memory cooperating therewith. The processor may be configured to monitor the plurality of devices via a network to obtain the respective metric data and generate a plurality of predicted trigger events based on monitoring the plurality of devices. The processor may also be configured to generate a respective adapted monitoring for the plurality of devices based upon each predicted trigger event, and, upon occurrence of one of the predicted trigger events, implement the respective adapted monitoring to obtain new respective metric data.

The processor may be configured to generate respective updated adapted monitoring for the plurality of devices based upon discarding non-occurred predicted trigger events. The processor may be configured to generate the respective adapted monitoring by adapting a polling frequency of the respective metric data, for example.

The processor may be configured to generate the plurality of predicted trigger events according to a learning prediction model, for example. The processor may be configured to, upon occurrence of an unpredicted trigger event, generate a new adaptive monitoring for the unpredicted trigger event and monitor the plurality of devices via the network to obtain the respective metric data. The processor may be configured to rank a probability of occurrence of each predicted trigger event and generate the respective adapted monitoring based upon the ranked probability, for example.

The plurality of predicted trigger events may include one of a metric-based trigger event and an environmental-based trigger event, for example. The plurality of devices may include a plurality of Internet of Things (IoT) devices.

A method aspect is directed to a method of monitoring metric data. The method may include using a processor cooperating with a memory to monitor a plurality of devices via a network to obtain the respective metric data. Each of the plurality of devices may be capable of generating respective metric data. The method may also include using the processor to generate a plurality of predicted trigger events based on monitoring the plurality of devices and generate a respective adapted monitoring for the plurality of devices based upon each predicted trigger event. The method may also include using the processor to, upon occurrence of one of the predicted trigger events, implement the respective adapted monitoring to obtain new respective metric data.

A computer readable medium aspect is directed to a computer readable medium for monitoring metric data. The computer readable medium may include computer executable instructions that when executed by a processor cause the processor to perform operations that include monitoring a plurality of devices via a network to obtain the respective metric data. Each of the plurality of devices is capable of generating respective metric data. The operations also include generating a plurality of predicted trigger events based on monitoring the plurality of devices and generating a respective adapted monitoring for the plurality of devices based upon each predicted trigger event. The operations further include, upon occurrence of one of the predicted trigger events, implementing the respective adapted monitoring to obtain new respective metric data.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
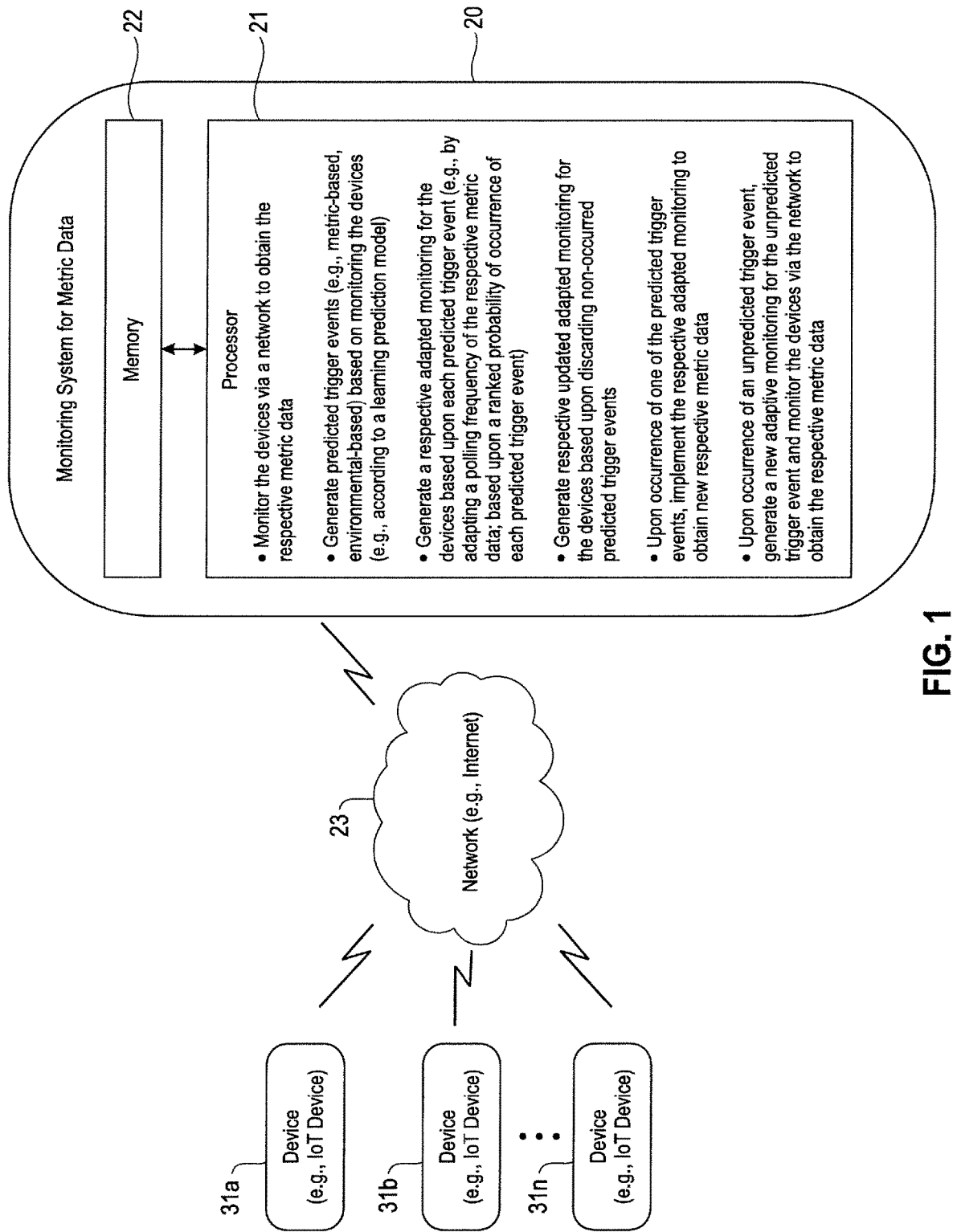
FIG. 1 is a schematic diagram of a monitoring system for metric data in accordance with an embodiment.
Figure 2:
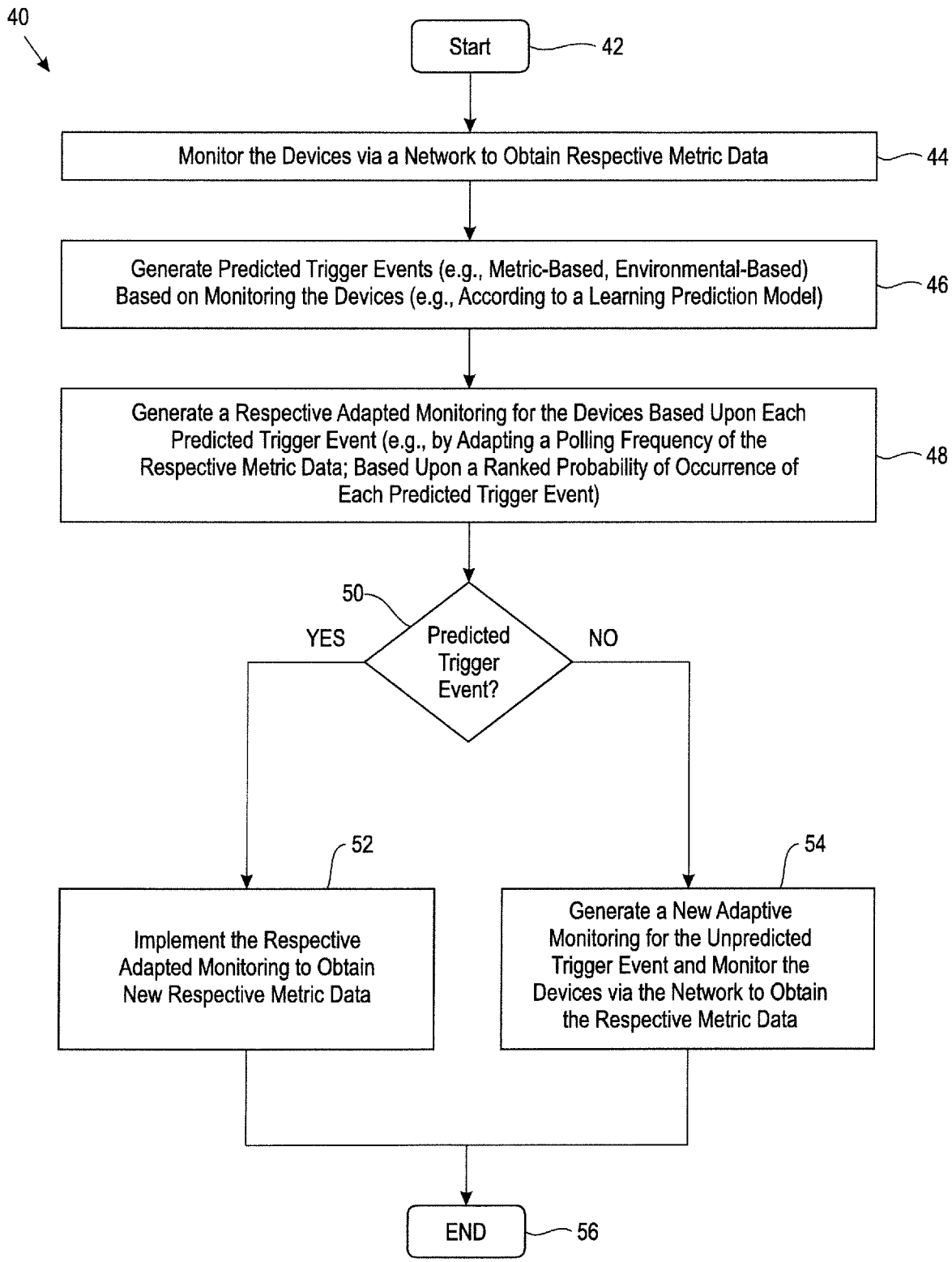
FIG. 2 is a flow diagram illustrating operation of the system of FIG. 1.

Referring initially to FIG. 1, and the flowchart 40 in FIG. 2, beginning at Block 42 a monitoring system 20 for metric data will now be described. The monitoring system 20 includes devices 31a-31n, such as, for example, Internet of Things (IoT) devices. Each device 31a-31n is capable of generating respective metric data.

The monitoring system 20 also includes a processor 21 and a memory 22 cooperating therewith. The processor 21 is configured to monitor the plurality of devices via a network 23 (e.g., the Internet) to obtain the respective metric data (Block 44). At Block 46, the processor 21 generates predicted trigger events based on monitoring the devices 31a-31n. The predicted trigger events are also generated based upon a learning prediction model. The predicted trigger events may include one of a metric-based trigger event and an environmental-based trigger event. Of course, the predicted trigger events may include other and/or additional types of events.

The processor 21 generates a respective adapted monitoring for the devices 31a-31n based upon each predicted trigger event (Block 48). Updated adapted monitoring for the plurality of devices 31a-31n may occur based upon discarding non-occurred predicted trigger events. The respective adapted monitoring may be generated by adapting a polling frequency of the respective metric data. In some embodiments, the processor 21 may rank a probability of occurrence of each predicted trigger event and generate the respective adapted monitoring based upon the ranked probability.

The processor 21, upon occurrence of one of the predicted trigger events (Block 50), implements the respective adapted monitoring to obtain new respective metric data (Block 52). In some embodiments, upon occurrence of an unpredicted trigger event (Block 50), the processor 21 generates a new adaptive monitoring for the unpredicted trigger event and monitors the devices 31a-31n via the network 23 to obtain the respective metric data (Block 54). The method ends at Block 56.

With respect to prediction, a current state of the system 20 may be defined by a list of metrics being monitored and their intensities. Given a historical evolution of the system 20 from different states to others corresponding to different events that trigger the transition from any state to the next, the prediction model is built. The prediction model learns from that data and predicts an evolution tree of any current state of the system 20. The prediction model also takes into account the different possible events that might trigger transitions from one state to the next and predicting the probabilities of these transitions.

Figure 3:
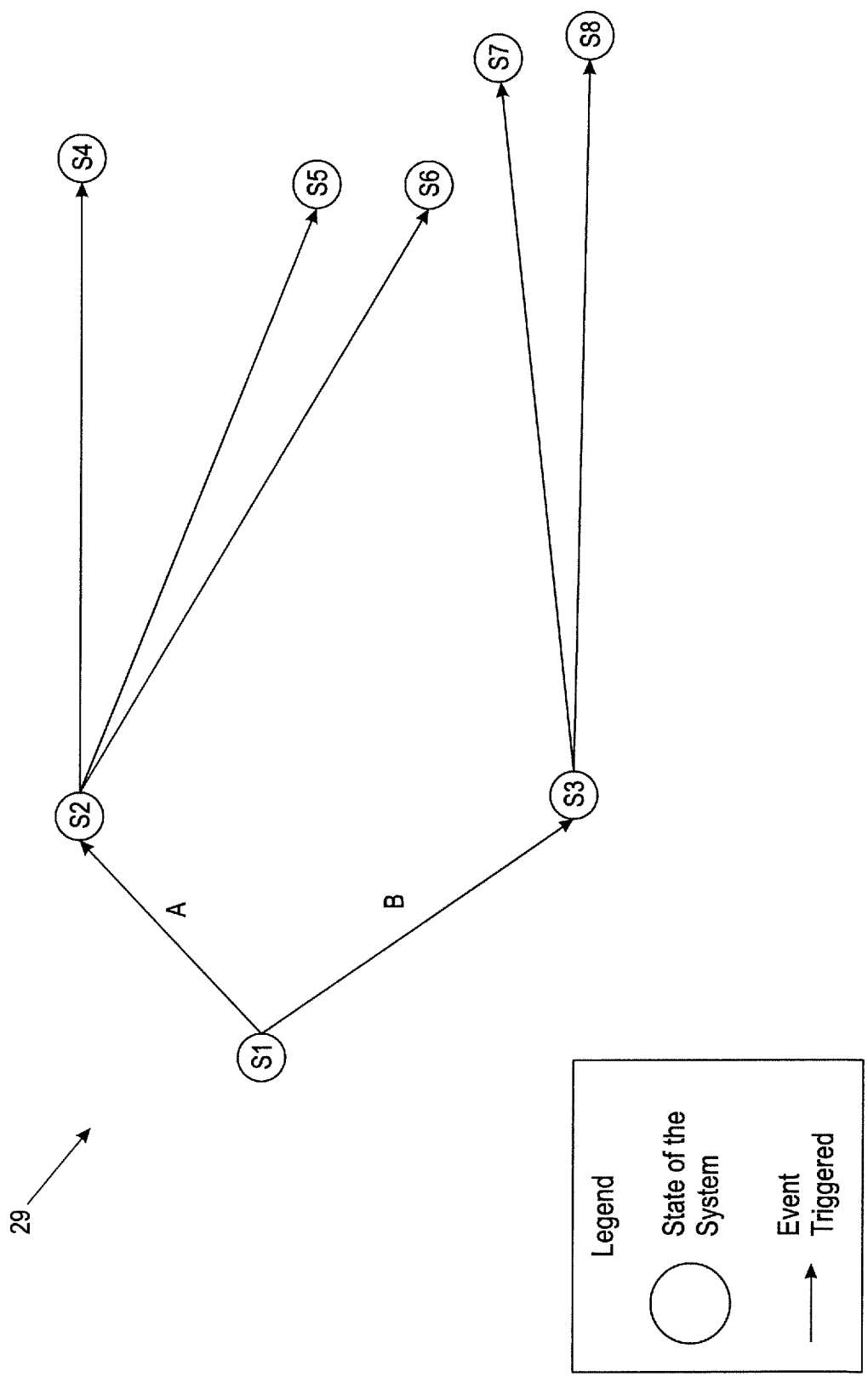
FIG. 3 is a tree diagram generated upon an event trigger in accordance with an embodiment.

Referring now additionally to FIG. 3, whenever an event trigger occurs, the prediction model is executed by the processor 21. The prediction model outputs a tree similar to the tree 29 illustrated in FIG. 3. That is, the processor 21 is predicting the events that would happen to trigger the transition from the current state to other states. The processing steps are executed for each state in the tree, in descending order of transition probability. That is, at each state, the processor 21 performs operations for steps for the event with the highest probability, followed by the one with a lower probability, etc., until all the events are executed out of that state.

More particularly, a breadth-first transition is performed. That is, the transitions in a level are not executed until all the transitions in the previous level are executed. In other words, with respect to the tree 29, assuming that the transition from S1 to S2 has a higher probability than that from S1 to S3 (and thus the transition from S1 to S2 will be executed before that of S1 to S3, the transitions from S2 to S4, S5, or S6 will not be executed until the transitions from S1 to S3 are executed.

The execution stops at a pre-specified depth d or the occurrence of a new trigger, whichever happens first. It should be noted that the pre-specified depth reduces, exponentially, memory and processor consumption or usage. Thus, when a new trigger occurs, the processed parts of the tree 29 that belong to events other than the triggered event are discarded. For example, suppose that event A occurred. In such a case, the processed results of the sub-tree generated by the occurrence of event B are discarded (i.e., State S3 and all of its children, S7 and S8). If an event happens that is not predicted and/or a new event is triggered before the processing steps are executed, the execution of the processing steps is delayed, and thereafter, begin executing the prediction model. As will be appreciated by those skilled in the art, the more accurate the prediction is, the lower the chance of an unpredicted event.

Further details of a monitoring system 20 will be described. With respect to monitoring, monitoring includes informing interested parties (humans or software) of the status of a specific metric (e.g., a device property, a service attribute, or a monitored object status/attribute). Monitoring may be particularly important for both service providers and service consumers. Monitoring may be a relatively important tool for controlling and managing hardware and software infrastructures as it provides key performance indicators for devices, objects, applications, and platforms. Additionally, monitoring may involve many activities such as, for example, resources planning and management, devices diagnostic, service level agreement (SLA) management, billing, troubleshooting, and security management.

The system 20 described herein is based mainly on two models for monitoring: monitoring by polling or by subscription. Monitoring by polling may be considered the simpler model of monitoring, as it allows the interested parties to request the current state of the monitored metric whenever desired. The interested parties can generally interact with a specific interface that provides a getter of the desired property. For example, monitoring the temperature of a room by polling involves querying a specific interface that would give us the current reading of the temperature.

Figure 4:
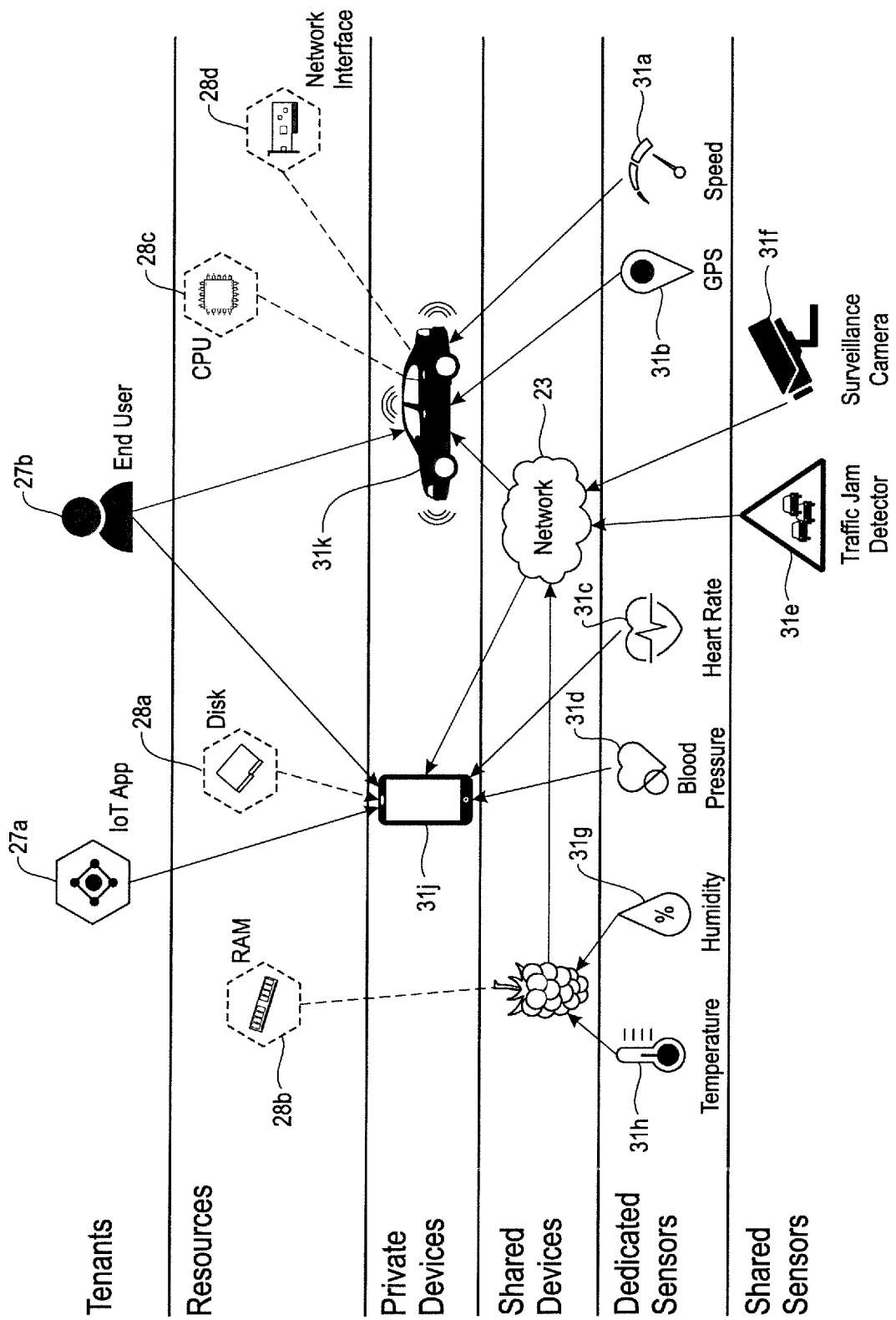
FIG. 4 is a diagram of an exemplary system topology including device and resources for use with a system in accordance with an embodiment.

Referring now briefly to FIG. 4, a typical topology of the system, for example, in the form of an IoT system, will now be described. More particularly, the topology may include various forms of devices that may define the system devices described herein. According to the topology, any IoT system is equipped with private devices such as smart phones 31j and cars 31k as well as shared devices such as a Raspberry Pis 31i deployed in the field. The IoT system 20 may also include sensors. These sensors can be dedicated to particular devices, such as a speed calculator 31a and a global positioning system (GPS) sensor 31b dedicated to a smart car, and blood pressure and heart rate sensors 31c, 31d linked to a patient's smart phone. Some other sensors 31a-31n can be shared by multiple devises such as traffic jam detectors 31e and surveillance cameras 31f. Dedicated sensors 31a-31d, 31g-31h are typically connected directly to their devices, e.g., without the need for a network, while shared sensors 31i can be connected to any device through a network 23. For example, a smart phone 31j can connect to a surveillance camera 31f through a network 23, while it has direct access to the blood pressure sensor 31d (through a local or private network, which is not illustrated in FIG. 1). Likewise, a smart car 31k has direct access to its speed calculator 31a and GPS sensors 31b while it connects to traffic jam detectors 31e through a network 23. Consequently, dedicated sensors 31a-31d, 31g-31h typically do not use any of the network bandwidth capacities of their dedicated devices.

All devices may be provided with resources 28a-28d to collect, process, and disseminate IoT data. For example, devices are equipped with resources for computing (CPUs) 28c, for storage (such as disks or memory) 28b, 28a for communication (e.g., network interfaces) 28d, and so on. Monitoring metrics typically require consumption of resources, e.g., to communicate with a sensor, store sensing data, and process sensing data. In addition, resources may be consumed by other applications running on the devices. Indeed, a tenant 27a, 27b may have multiple up and running applications besides the monitoring services described herein. Consequently, the amount of available resource capacities may change over time.

Exemplary implementations for the system 20 will now be described. A first example is directed to monitoring routes for smart cars. During a navigation task, including turn-by-turn directions, a route from a starting point to a destination is selected. The route is determined according to a pre-defined rule (e.g., minimizing or reducing the time to the destination or minimizing the distance to the destination). The navigation task includes monitoring metrics such as traffic flow (e.g. speed and accidents), speed of the physical devices, and their locations (GPS). The frequency of measurements and any alternative routes that are monitored may be limited due to resource constraints of the physical device or the network in communication with the physical device.

In response to the occurrence of a traffic accident on the current route, the physical device changes a physical setting to receive traffic data corresponding to alternative routes so that the navigation task can determine if a quicker route is available. In this case, the monitoring is adapted via adding and removing metrics based on the occurrence of an environment-related event, which is the traffic accident in this context. Such adaptation might be metric value-based as well. This is the case when, for instance, the measured traffic speed happens to be below a threshold. In this case, the physical device will respond by changing a physical setting to receive traffic data corresponding to alternative routes.

Another example is directed to monitoring in healthcare applications. Suppose the blood pressure for a certain patient is measured once per week. An example of value-based adaptation is when the value of the measurement goes above (or below) a certain predefined threshold, triggering the need to monitor this metric more or less frequently, e.g., on a daily or a monthly basis. Another example is that a value of a measurement satisfying a monitoring condition can affect the selection of metrics to be measured. This might include adding an additional metric, e.g. a measurement of the heart rate, or removing a metric, e.g. stopping the blood pressure measurement.

The system 20 described herein updates the choice of metrics to be monitored and their optimal monitoring frequencies with event-based and/or environmental-based triggers while taking into account resource constraints. As an overview, the approach of the system 20 may be summarized by Algorithm 1, below. The monitoring system 20 considers a set of metrics to monitor and the frequencies those metrics should be monitored at. Metrics and their frequencies are continuously adapted using Algorithm 1.

---

Algorithm 1: Metric Adaptation and Frequencies Optimization

1: while true do
2:    On event Triggered do
3:       if the event is environment-related then
4:          Adapt metrics (add, remove, and retain metrics)

---

-continued

Algorithm 1: Metric Adaptation and Frequencies Optimization

5:          Compute metric weights
6:          Optimize metric frequencies
7:       else
8:          if the event is metric value-based then
9:            if there is a need to extend monitoring to correlated metric then
10:               Adapt metrics (add, remove, and retain metrics)
11:               Compute metric weights (function of added and retained metrics, and the event)
12:            else
13:               Compute metric weights (function of retained metrics and the event)
14:            end if
15:            Optimize metric frequencies
16:          end if
17:       end if
18:    End Event
19: end while

---

The above algorithm works as follows: If any environment related event that may have any impact on monitored metrics is triggered, then the set of metrics to be monitored is adapted (lines 2-4), the weights of these metrics is computed (line 5), and the frequencies of those metrics should be monitored at are determined (line 6). If any metric value-based event is triggered and if the metric value induces a need to extend the monitoring to correlated metric(s), then the set of metrics to be monitored is adapted (lines 8-10) and their weights are computed (line 11). If the value of the metric value-based event does not induce any needs to change the retained metrics, then only metric weight computation is needed (line 13). In either case, the frequencies at which those metrics should be monitored is determined (line 15).

Adaptation of metrics, computation of metric weights, and optimization of metric frequencies will now be described. With respect to metric adaptation, metric adaptation is enacted by an environment-related event (Algorithm 1, line 3) or value related event that induces a need to extend the monitoring to correlated metric(s) (lines 8-10). More precisely, metric adaptation is based on correlation between metrics on one hand and correlation between metrics and environment related events on the other hand. Correlations allow to retain, add, or remove the metrics to be monitored.

A metric may be correlated with one or more of the other metrics. This connotes that the monitoring of a metric may depend on the value of another monitored metric, i.e., the monitoring value of a metric may trigger the monitoring of another metric. For example, blood pressure and heart rhythm are correlated. If the measured blood pressure turns out to be over a certain threshold (i.e. a metric value-based event is triggered), a metric to monitor heart rhythm should be added. The correlation in this case is positive and may induce adding a new metric(s). Correlations can also be negative and may induce removing of a monitored metric(s).

A metric may be correlated with one or more environment-related event. An environment-related event is associated with an adaptation rule that includes a predefined set of metrics that are to be monitored in response to the occurrence of the event, thus metrics are added and removed based on the predefined set of metrics. For example, if it is raining, a metric to monitor the traffic speed is added. Another example is the triggering of an environment-related event specifying that the monitored route of a smart car is closed for some car accident. In this case, the smart car needs to begin getting monitoring data for the other new routes to be used and at the same time stop getting monitoring data for the closed/jammed route. The environment-related event would be described such that it would be positively correlated to metrics of the new routes and negatively correlated to the closed/jammed route.

With respect to computation of metric weights, weights are assigned to the metrics that are currently monitored (retained and not removed) and any newly added metric(s) to be monitored. Computation of metric weights depends on whether a metric value-related event or an environment-related event has been the trigger. In the case of metric value-related events that induce a need to extend the monitoring to correlated metric(s), the weight of each of the metrics to be added is computed as an aggregation function of the weights of the metric that triggered the event, the weights of other metrics already being monitored that the newly added metric is correlated with, and the correlation coefficient between them. An example of such function is the multiplications of correlation coefficients. If the value-related event doesn't induce a need to extend the monitoring to any new metrics, the newer weights of the existing metric(s) that triggered the event are computed as a non-decreasing function of the absolute difference from the monitored metric value and the threshold value (or threshold difference) that triggered the value related event.

In the case of environment-related events, weights of the metrics to be added are computed as an aggregation function of the correlation coefficient between that metric and the environmental-related event, the weights of other metrics already being monitored that the newly added metric is correlated with, and the correlation coefficient between them.

With respect to frequency optimization, let I represent the set of metrics to be monitored. There are different possible frequency intervals at which each metric (e.g., monitor each 10 ms or each 2 minutes) can be monitored. Let K be the set of these intervals, ordered from the lowest to the highest interval value. We assume that the minimum and maximum possible monitoring interval for each metric are given. The minimum possible value in K is the minimum among these minimums, $k_{min}$ and vice versa for $k_{max}$ or $|K|$, where $|K|$ is the cardinality of the set k. The difference between the values of each two successive elements of the set K is equal to the minimum given interval value. We also define set J as the set of potential time stamps at which we can do any of the monitoring. $|J|$, the cardinality of set J is equal to the $k_{max}$ (or $|K|$). Elements of J are also ordered, and the step size between each element and the next is equal to a given/chosen minimum precision value. Computing the optimal frequency interval for each metric $i \in I$ is the main target of this problem with the objective of maximizing the monitoring frequency of the metrics with higher weights. We define $w_i$ as the given weight for metric $i \in I$. Let the binary variable Interval$_{ki}$ be 1 if metric $i \in I$ is to be monitored at frequency $k \in K$, and zero otherwise. Let the binary variable $B_{ij}$ be 1 if the monitoring of metric $i \in I$ is to start at time stamp $j \in J$, and zero otherwise.

There is a number of resources that are used for the metric monitoring. Let R represent the set of these resources. Each resource $r \in R$ has a given capacity rcap$_{rj}$ at time stamp $j \in J$. Each metric $i \in I$ utilizes an amount ut$_{ir}$ of resource $r \in R$ when it is being monitored at any time stamp. Lastly, let the binary variable $X_{ij}$ be 1 if metric $i \in I$ is to be monitored at time stamp $j \in J$, and zero otherwise. Note that the way the set J is defined permits that the solution of the optimization model will determine the optimal monitoring intervals and time stamps for one complete cycle. This cycle should be repeated when these results are implemented.

Given the aforementioned notation, a problem can be formulated in equations 1-10, below, where objective function 1 maximizes the monitoring frequency of the metrics with a direct linear proportion to their weights. Constraint 2 ensures that each metric begin to be monitored only once during the planning time cycle. Constraint 3 guarantees that each metric is assigned only one interval size. Constraints 4 and 5 set the relationship between the $X_{ij}$ variables and $B_{ij}$ ones, where the former sets the binary variable corresponding to the first monitored time stamp to 1, and the latter sets all the monitorings before the first one for each metric to zero. Thus, so far, the monitoring of each metric will begin at the specific time that the model chooses and will not again begin earlier. Constraint 6 sets the next monitorings at the equal chosen interval for each metric. Constraint 6 ensures that, if interval $k \in K$ is the chosen one for a certain metric, exactly one period out of each k successive ones is chosen as a monitoring period for that metric. Constraint 7 corresponds to resource capacity and sets each time stamp $j \in J$, the total resource utilization of each metric that is to be monitored at that time stamp, so that it is less than or equal to the available resources at that time stamp for each resource in the set $r \in R$. Constraints [8-10] are the binary restrictions of the binary variables.

$$\max \sum_{i \in I} \sum_{j \in J} w_i * X_{ij} \quad (1)$$

$$\text{s.t.} \sum_{j \in J} B_{ij} = 1, \quad \forall i \in I \quad (2)$$

$$\sum_{k \in K} Interval_{ki} = 1, \quad \forall i \in I \quad (3)$$

$$X_{ij} \geq B_{ij}, \quad \forall i \in I, \quad \forall j \in J \quad (4)$$

$$X_{il} \leq (1 - B_{ij}), \quad \forall l \in \{1 \ldots j-1\}, \quad \forall i \in I \quad (5)$$

$$\sum_{z \in \{j, \ldots, j+k-1\}} X_{iz} = Interval_{ki}, \quad (6)$$
$$\forall i \in I, \quad \forall j \in J : (j+k-1) \in J, \quad \forall k \in K$$

$$\sum_{i \in I} ut_{ir} * X_{ij} \leq rcap_{jr}, \quad \forall j \in J, \quad \forall r \in R \quad (7)$$

$$X_{ij} \in \{0, 1\}, \quad \forall i \in I, \quad \forall j \in J \quad (8)$$

$$B_{ij} \in \{0, 1\}, \quad \forall i \in I, \quad \forall j \in J \quad (9)$$

$$Interval_{ki} \in \{0, 1\}, \quad \forall k \in K, \quad \forall i \in I \quad (10)$$

However, metric adaptation, metric weight computation, and frequency optimization may take a relatively long time to run or execute, during which triggers in the system might happen before getting the optimal solution to adopt. This may be particularly important in some applications where real-time or near real-time processing is desirable, e.g., healthcare and aviation sectors.

Figure 5:
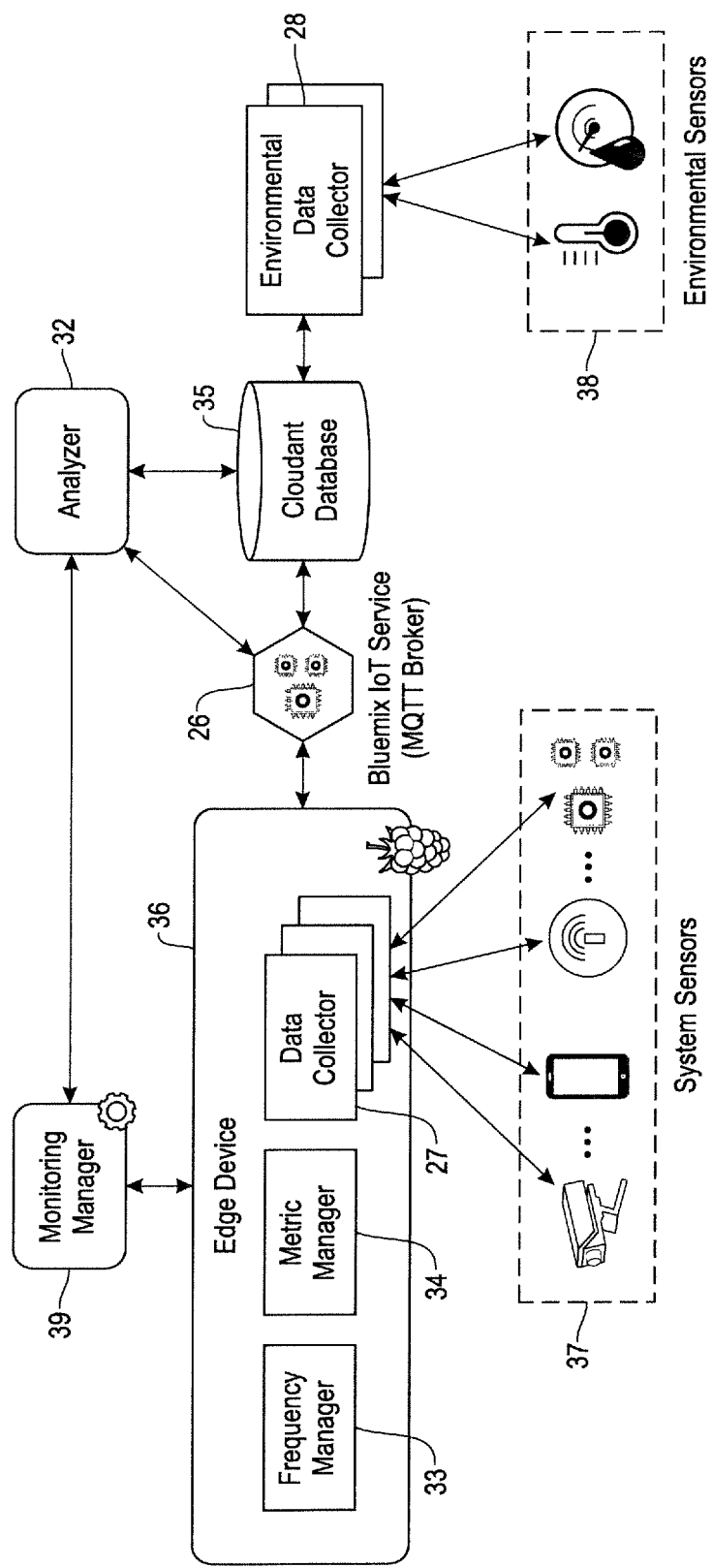
FIG. 5 is a schematic diagram of an exemplary implementation in accordance with an embodiment.

The implementation realized during a proof of concept preparation will now be described. Referring now to FIG. 5, the system 20 was implemented with four Raspberry Pi 3 boards model V as corresponding to the edge devices 36 connected to the system. The different components that make the proof of concept are the system sensors 37 and environmental sensors 38 responsible for collecting monitoring data. These sensors 37, 38 are driven by data collectors 27, 28. Moreover, a monitoring manager 39 configures the data collectors 27 of the system sensors 37 through two local agents: a frequency manager 33 and a metric manager 34. An analyzer 32 implements the optimization algorithms and analyzes the collected data and the correlation between the metrics as described above. All monitoring data is stored in a Cloudant database 35 offered by Bluemix®.

The system sensors 37 are driven by data collectors 27 that dictate which metric to be collected and at which frequency. The metrics to be monitored are specified by the metric manager 34. This component can turn on and off the data collection by activating and deactivating a specific data collector 27. The frequencies of the data collection is controlled by the frequency manager 33, which can tune the frequency of data collection of a given metric through its data collector 27. These three components (the frequency manager 33, the metric manager 34, and data collector 27) are implemented as Java applications exposing REST interfaces to facilitate the communication. Jersey JAX-RS (JSR 311) was used for the RESTful implementation. They are deployed as docker containers running on our Raspberry Pi boards.

Since Raspberry Pi boards have an ARM processor, it is not currently possible to run regular docker containers on them. This is because the regular docker containers are built for a totally different architecture of processors. Thus, instead, the "hypriot/rpi-java3" base image was used to build the containers.

The frequency manager 33 receives the ID of the metric and the new monitoring frequency. This component also caches the previous frequencies of monitoring. When it receives a new frequency, it compares it to the old value. If that value is different, it reconfigures the associated data collector 27. If it is not, then it updates its record. The metric manager 34 offers interfaces for CRUD functions of metrics. It permits adding a new metric, listing the monitored metrics, updating an existing metric, and deleting a metric. The data collector components, are instantiated on demand by the metric manager 34. They are responsible for collecting the data from the sensors, transforming that data to the standard format that the system 20 understands, and publishes them to the Bluemix® IoT platform 26. Each collector has a default frequency of data collection. This frequency may be changed via an interface exposed by the collector. It is noteworthy that each collector is configured to autoregister to the Bluemix® IoT platform 26 to enable it to send its data using MQTT. Moreover, the analyzer 32 and the monitoring manager 39 as two Java web applications deployed on the Bluemix® Platform 26 as a service. The analyzer 32 consumes the data from the Cloudant database 35 which applies the optimization model described above, and determines the optimal metrics to be monitored and the optimal frequencies. The optimization model is solved via CPLEX, which has a collable library in Java. The output of the analyzer 32 is sent to the monitoring manager 39 as a REST POST query. The monitoring manager 39 has the list of devices and their capacities in terms of monitoring. Upon receiving the set of metrics to be monitored and their frequencies, the monitoring manager 39 sends the needed REST queries to the right targets to add or remove metrics through the metric managers 34 and to tune the frequencies through the frequency managers 33.

It should be noted that in production environments it is recommended to use a broker like Bluemix® IoT broker or service 26 to register all the sensors 37, 38. But for the sake of simplicity, in the present example, the environmental sensors 38 were not registered to the broker 26. Instead, the environmental sensors 28 were set to target the Cloudant database 35 using its URL without passing through the broker 26.

Given the limited resources for metric monitoring in IoT environments, it may be desirable to provide a mechanism that determines which metrics to monitor and at which frequencies, with the objective of increasing the monitoring frequencies of metrics that have a higher importance as much as possible. Accordingly, the system 20 provides such mechanism in which the metrics to be monitored are iteratively determined, assign with weights of importance and then optimized, via a mathematical model, the frequency at which each metric is to be monitored. Indeed, the metrics to be monitored and their frequencies get changed whenever an environmental and/or metric-value event triggers that change.

As will be appreciated by those skilled in the art, monitored data are typically consumed in systems and/or applications that use constrained IT resources, e.g., network facilities, storage, display, processing/computing power, energy. That is why it may be considered practically impossible to collect metric data with a very high frequency given the limited quantity of resources used by monitoring systems and applications. For example, the amount of data one can send through a network is constrained by the bandwidth and storage of that network. In addition, even if one can collect any amount of data and send it through a network, processing such massive data is time and resource consuming. This may be an issue for real-time based applications evolving in resource constraint environments, such as IoT systems. Moreover, event-based changes as well as environmental context ones may affect the choice of metrics to be monitored in IoT environments and/or their frequencies. Accordingly, the system 20 may address these issues, through the mathematical optimization model described above that optimally determines the metric that should be monitored and their monitoring frequencies. As described above, the system 20 is adaptive as the choice of metrics to be monitored and their optimal monitoring frequencies are updated with event-based and/or environmental-based triggers.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A monitoring system for metric data comprising:
a plurality of devices, each device capable of generating respective metric data; and
a processor and a memory cooperating therewith, the processor configured to
monitor the plurality of devices via a network to obtain the respective metric data,
generate a plurality of predicted trigger events based on monitoring the plurality of devices,
generate a respective adapted monitoring for the plurality of devices based upon each predicted trigger event,
upon occurrence of one of the predicted trigger events, implement the respective adapted monitoring to obtain new respective metric data, and
generate respective updated adapted monitoring for the plurality of devices based upon discarding non-occurred predicted trigger events.

2. The monitoring system of claim 1 wherein the processor is configured to generate the respective adapted monitoring by adapting a polling frequency of the respective metric data.

3. The monitoring system of claim 1 wherein the processor is configured to generate the plurality of predicted trigger events according to a learning prediction model.

4. The monitoring system of claim 1 wherein the processor is configured to, upon occurrence of an unpredicted trigger event, generate a new adaptive monitoring for the unpredicted trigger event and monitor the plurality of devices via the network to obtain the respective metric data.

5. The monitoring system of claim 1 wherein the processor is configured to rank a probability of occurrence of each predicted trigger event and generate the respective adapted monitoring based upon the ranked probability.

6. The monitoring system of claim 1 wherein the plurality of predicted trigger events comprises one of a metric-based trigger event and an environmental-based trigger event.

7. The monitoring system of claim 1 wherein the plurality of devices comprise a plurality of Internet of Things (IoT) devices.

8. A method of monitoring metric data comprising:
using a processor cooperating with a memory to
monitor a plurality of devices via a network to obtain the respective metric data, each of the plurality of devices being capable of generating respective metric data,
generate a plurality of predicted trigger events based on monitoring the plurality of devices,
generate a respective adapted monitoring for the plurality of devices based upon each predicted trigger event,
upon occurrence of one of the predicted trigger events, implement the respective adapted monitoring to obtain new respective metric data, and
generate respective updated adapted monitoring for the plurality of devices based upon discarding non-occurred predicted trigger events.

9. The method of claim 8 wherein using the processor comprises using the processor to generate respective adapted monitoring by adapting a polling frequency of the respective metric data.

10. The method of claim 8 wherein using the processor comprises using the processor to generate the plurality of predicted trigger events according to a learning prediction model.

11. The method of claim 8 wherein using the processor comprises using the processor to, upon occurrence of an unpredicted trigger event, generate a new adaptive monitoring for the unpredicted trigger event and monitor the plurality of devices via the network to obtain the respective metric data.

12. The method of claim 8 wherein using the processor comprises using the processor to rank a probability of occurrence of each predicted trigger event and generate the respective adapted monitoring based upon the ranked probability.

13. A non-transitory computer readable medium for monitoring metric data, the non-transitory computer readable medium comprising computer executable instructions that when executed by a processor cause the processor to perform operations comprising:
monitoring a plurality of devices via a network to obtain the respective metric data, each of the plurality of devices being capable of generating respective metric data;
generating a plurality of predicted trigger events based on monitoring the plurality of devices;
generating a respective adapted monitoring for the plurality of devices based upon each predicted trigger event;
upon occurrence of one of the predicted trigger events, implementing the respective adapted monitoring to obtain new respective metric data; and
generate respective updated adapted monitoring for the plurality of devices based upon discarding non-occurred predicted trigger events.

14. The computer readable medium of claim 13 wherein the operations comprise generating the respective adapted monitoring by adapting a polling frequency of the respective metric data.

15. The computer readable medium of claim 13 wherein the operations comprise generating the plurality of predicted trigger events according to a learning prediction model.

16. The computer readable medium of claim 13 wherein the operations comprise, upon occurrence of an unpredicted trigger event, generating a new adaptive monitoring for the unpredicted trigger event and monitoring the plurality of devices via the network to obtain the respective metric data.

17. The computer readable medium of claim 13 wherein the operations comprise ranking a probability of occurrence of each predicted trigger event and generate the respective adapted monitoring based upon the ranked probability.

* * * * *